United States Patent [19]

Haluko, Jr.

[11] 4,289,040
[45] Sep. 15, 1981

[54] LINEAR MOTION DEVICE

[75] Inventor: Michael Haluko, Jr., Lawrenceville, N.J.

[73] Assignee: Kinematics, Inc., Princeton, N.J.

[21] Appl. No.: 70,088

[22] Filed: Aug. 27, 1979

[51] Int. Cl.³ ...................... F16H 25/12; F16H 37/12
[52] U.S. Cl. ......................................... 74/50; 74/55; 414/749
[58] Field of Search .................. 74/25, 27, 50, 55; 414/749, 750, 751, 752, 753, 591

[56] References Cited

U.S. PATENT DOCUMENTS

| | | | |
|---|---|---|---|
| 1,809,430 | 6/1931 | Van Duyn | 74/44 |
| 2,350,334 | 6/1944 | Baker | 74/44 |
| 2,621,967 | 12/1952 | Sorenson | 74/25 |
| 2,687,649 | 8/1954 | Seragnoli | 74/44 |
| 3,703,834 | 11/1972 | Beezer | 414/749 |
| 3,865,253 | 2/1975 | Healy | 414/751 |
| 3,881,362 | 5/1975 | Beezer | 414/749 |
| 4,030,614 | 6/1977 | Taneda et al. | 414/751 |
| 4,036,374 | 7/1977 | Woltjen | 414/591 |
| 4,052,898 | 10/1977 | Miller et al. | 74/44 |

FOREIGN PATENT DOCUMENTS 524676  8/1940  United Kingdom ............... 74/50

OTHER PUBLICATIONS

"Ferguson All Mechanical Dual Motion Parts Handler," Bulletin H-72B, Ferguson Machine Company, 1973.
"Building Blocks for Automation," Stelroh Cam Company.

*Primary Examiner*—Lawrence J. Staab
*Attorney, Agent, or Firm*—John J. Kane; Frederick A. Zoda; Albert Sperry

[57] ABSTRACT

A linear motion device particularly usable for providing a lateral movement stroke with vertical lifting and dropping performed at the extreme limits of movement of the lateral stroke which includes a base, two vertical shafts fixedly secured to the base and extending upwardly therefrom, a yoke movably secured to the vertical shafts to be vertically movable with respect thereto. The yoke member including a yoke pin extending outwardly therefrom into a lift cam which is circular and rotatably driven by being fixedly secured to a drive shaft, the lift cam achieving selective vertical movement of the yoke member responsive to the profile of the cam therein. The device further including a crank being reciprocally movable and secured to the drive shaft wherein the crank includes a pin at the outward section thereof which is radially movable toward and away from the axis of the drive shaft, the pin selectively rotatable within the channel of a plate cam at one end and in the channel of a vertical orientation device at the other end, the vertical orientation device secured to horizontally extending members which themselves provide the X and Y stroke of the movement, lateral movement achieved by the movement of the crank pin within the plate cam channel and vertical movement of the horizontal members achieved by the rotation of the plate cam with the yoke pin extending into the channel thereof.

15 Claims, 4 Drawing Figures

LINEAR MOTION DEVICE

BACKGROUND OF THE INVENTION

1. Field of the Invention

The present invention deals with the field of linear motion devices and specifically with linear "pick and place" devices which are particularly designed to grasp an article at one location move upward then laterally transfer the article to a new location and move downward and then release the article. Then the translator moves upwardly and initiates the cycle again. Many types of such X,Y movement devices exist within the prior art including self-contained X,Y movements, linear pick and place devices, hand-over-hand feeds, X,Y positioning and feed devices and the like.

2. Description of the Prior Art

Examples of prior art devices are given in Patents Nos. 524,676 (British); and U.S. Pat. Nos. 1,809,430; 2,350,334; 2,621,967; 2,687,649 and 4,052,898.

The most pertinent patent is British Patent Specification No. 524,676 which discloses an improvement relating to a driving gear for locomotives or other vehicles and engines. This device shows a basic square cam driving a vertically movable pin therein wherein the pin is radially reciprocal with respect to the drive shaft of the crank. This device does not include the combination of the lift cam and mounting system as claimed in the present invention.

Other prior art devices specifically used for linear pick and place devices are normally arrangements of complex mechanical interactions between barrel cams and linear placing horizontally extending parallel shafts. The present invention provides a novel device for "pick and place" which achieves this by a combination of a lift cam and a plate cam which in cooperation achieve the end result of the standard barrel cam pick and place devices but with increased efficiency and reliability.

SUMMARY OF THE INVENTION

The present invention provides a linear motion device for providing lateral movement as well as selective vertical lifting which includes a base with a vertical shaft means such as two vertically extending shafts fixedly secured to the base. Mounted to these vertically extending shafts is a yoke member which is vertically movable with respect to the shaft via a bearing means or the like such that horizontal movement of the yoke is prevented by the vertical shafts but the vertical movement is facilitated.

The power for the present invention is provided through a drive shaft to which is directly and fixedly connected a lift cam. The lift cam is thereby rotatably movable with the drive shaft. The lift cam defines a lift channel therein which is positioned to receive a yoke pin. This yoke pin is fixedly secured to the yoke member and as such as the yoke pin is urged to move upwardly and downwardly by the lift channel of the lift cam means it will operably control the upward and downward movement of the yoke member itself responsive to the specific profile chosen for the lift channel.

The drive shaft extends further from the lift cam and at the end thereof a crank means is secured thereto. This crank means is therefore also rotatable therewith. The crank means includes a crank pin which is radially reciprocally movable with respect to the crank shaft. The specific configuration of the crank can be such that the crank has a crank head to which the crank pin is secured and a crank body which is fixedly secured to the drive shaft. The crank head and crank body themselves are then reciprocally movable with respect to one another to allow variation in the distance between the crank pin and the axis of the rotating drive shaft. In this manner the crank pin is free to follow the profile of any cam into which it extends.

Preferably the crank pin will include a first projection extending rearwardly therefrom and a second projection extending forwardly therefrom. The crank is positioned adjacent a plate cam which defines a plate cam channel therein. This plate cam channel is positioned behind the rotating crank and as such is adapted to receive the rearward or first projection of the crank pin therein to operably control the radial reciprocation of the crank pin with respect to the crank shaft. This would be responsive to the actual profile chosen for the plate cam.

The present invention further includes horizontal shafts which may be one or preferably two shafts or it could be more which are movably secured with respect to the yoke member to allow relative horizontal movement with respect thereto. The interconnection between the horizontal shafts and the yoke is by way of a bearing means to facilitate horizontal displacement of the horizontal shaft means with respect to the yoke.

The present invention further includes a vertical guide means which is fixedly secured to the horizontal shaft means at a pre-chosen position therealong. The vertical guide means defines a vertical guide channel therein which is positioned immediately forward of the crank and as such is adapted to receive the second forwardly extending projection of the crank pin therein. The vertical guide channel actually extends in a vertical direction to thereby cause horizontal movement of the horizontal shaft means responsive to the specific horizontal component of movement of the second projection of the crank pin. Furthermore this vertical guide channel prevents vertical movement of the second horizontal shaft means responsive to the vertical component of movement of the second projection of the crank pin. In this manner vertical movement of the horizontal shaft means is controlled by the vertical movement of the yoke.

The profile of the lift channel should be chosen generally circular with radially inwardly extending sections to thereby selectively cause lifting of the yoke member at pre-chosen orientations with respect to the movement caused by the crank.

The vertical guide means preferably is configured as a bracket member extending between the two horizontally extending members. In this manner more accurate control of lateral displacement of the horizontally extending shafts can be achieved by the rotational movement of the crank.

Preferably the yoke is configured having two C-shaped sections which are each vertically movable and yet secured to the vertically extending shafts to thereby maintain true vertical orientation during movement. To facilitate returning upward movement of the yoke member along the vertically extending shafts a spring biasing means may be positioned between the base and the yoke.

The plate cam channel is preferably square with rounded corners to provide maximum horizontal movement during such movement and to provide a dwell period at each maximum location of the horizontal stroke to allow the picking and placing operation to actually take place caused by the lifting and dropping of the lift cam.

It is an object of the present invention to provide a linear motion device which specifically accomplishes "pick and place" movements.

It is an object of the present invention to provide a linear motion parts handler which is reliable and relatively maintenance free.

It is an object of the present invention to provide a linear motion device which selectively has combined or independent motions in the X,Y plane.

It is an object of the present invention to provide a linear motion device for performing operations of horizontal movement.

It is an object of the present invention to provide a linear motion device which has maximum horizontal movement during such movement and which includes a dwell at the two extremes of horizontal motion to allow operations and other functions to be performed at these locations.

It is an object of the present invention to provide a linear motion device for providing lateral movement stroke and selective vertical lifting which is inexpensive in comparison with the operation of the prior art devices.

It is an object of the present invention to provide a linear motion device which allows control of the lifting by simple replacement of the lift cam.

It is an object of the present invention to provide a linear motion device which requires a very minimum of adjustments in order for continued reliable and efficient operation.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 2:
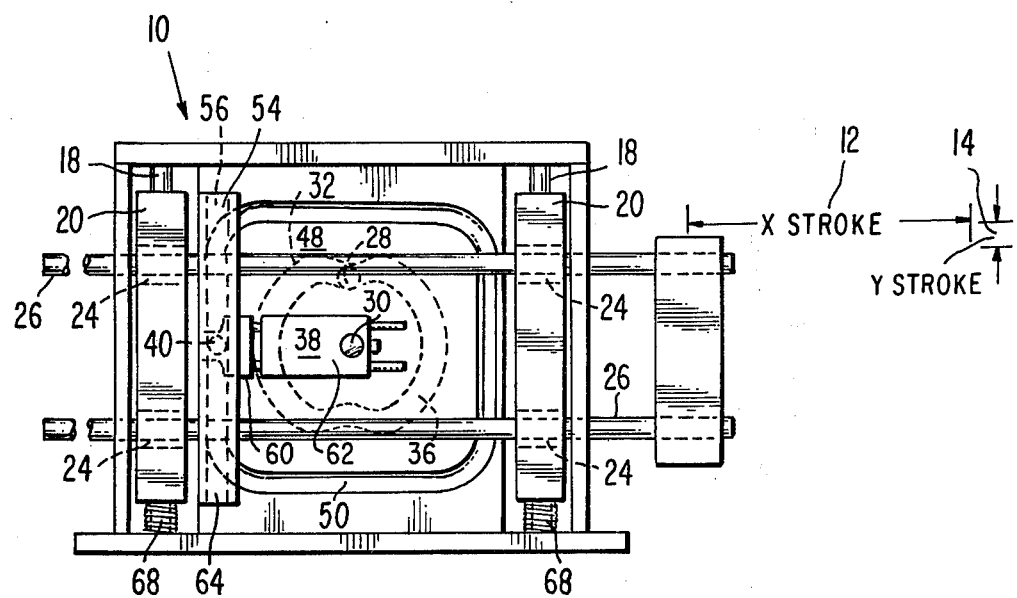
FIG. 2 is a front sectional view of an embodiment of the linear motion device shown in FIG. 1.
Figure 3:
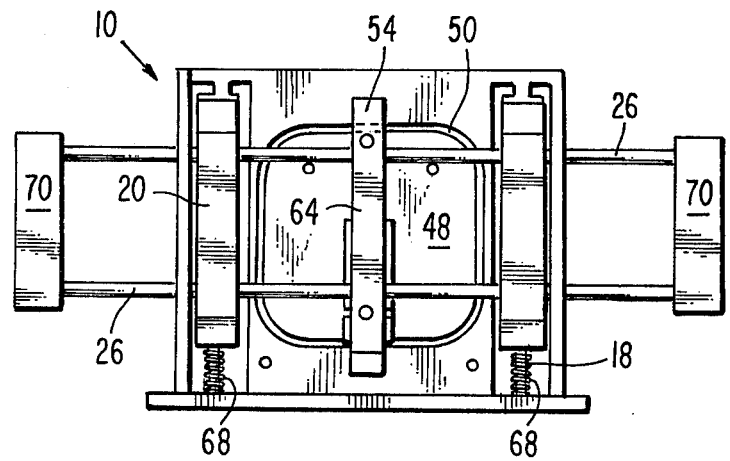
FIG. 3 is a front plan view showing an embodiment of the linear motion device during horizontal stroke movement.
Figure 4:
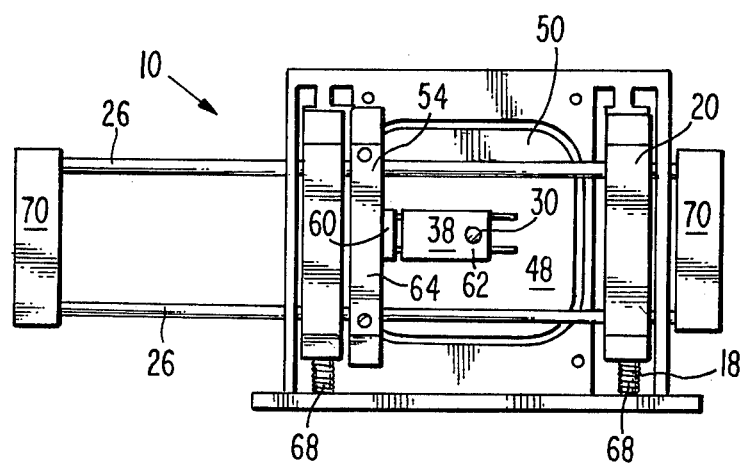
FIG 4 is a front plan view showing an embodiment of the linear motion device during vertical stroke movement.

The present invention provides a linear motion device which is operable to provide controlled accurate linear motion in a combined horizontal and vertical direction. Specifically the present invention is operable to provide a given lateral movement stroke 12 as shown in FIG. 2 with a given vertical movement stroke 14 of lifting and dropping as shown by the Y stroke in FIG. 2. The present invention specifically performs the Y stroke each time the X stroke 12 is at the outward extreme position.

To accomplish this motion the linear motion device 10 of the present invention includes a base member 16. This base includes a vertical shaft means 18 such as two vertical shafts extending upwardly therefrom. Secured to these vertical shafts is a yoke member 20. This means of securement allows vertical movement of the yoke member 20 with respect to the vertical shaft means 18 but prevents horizontal movement with respect thereto. For this purpose vertical yoke bearings 22 are positioned around the shafts 18 at the points where they extend through the yoke member 20. The yoke 20 also includes a yoke pin 28 extending rearwardly therefrom.

Figure 1:
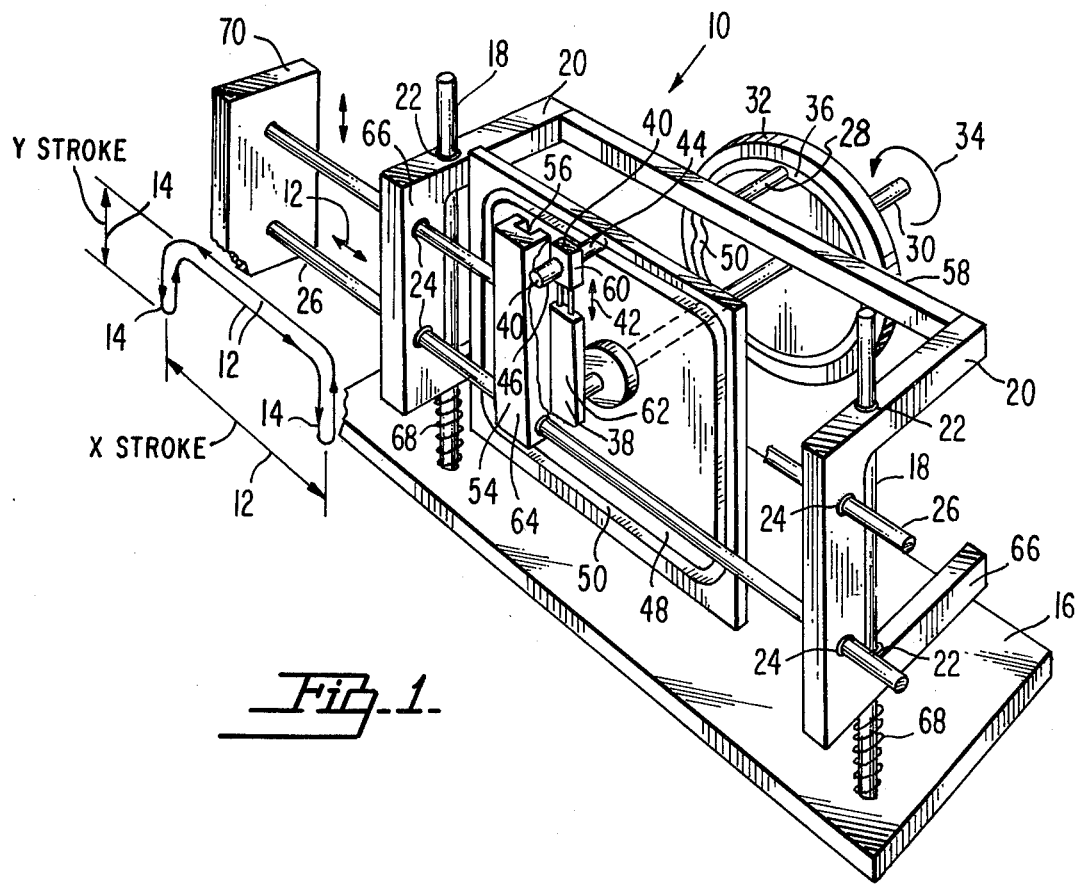
FIG. 1 is a perspective exploded view of an embodiment of the linear motion device of the present invention.

The present invention further includes a drive shaft 30 which is preferably drivable in a counterclockwise direction 34 when viewed from the front as shown in FIG. 1.

This drive shaft has fixedly secured thereto a lift cam means 32. The lift cam means defines a lift channel 36 therein. This lift channel is adapted to receive the yoke pin 28 therein. In this manner rotation of the drive shaft 30 will cause rotation of the lift cam means 32. The lift channel 36 itself includes radially inwardly extending sections 58 and as such will operably control vertical movement of the yoke member 20 by causing up and down movement of the yoke pin 28.

The drive shaft 30 is secured at a further location to a crank means 38. Crank means 38 preferably is a two part device including a crank head 60 and a crank body 62. The crank head 60 will be reciprocally radially movable toward and away from the axis of rotation of the crank. A crank pin 40 will be secured to the crank head 60. Actually it is only necessary that the crank pin 40 be movable with respect to the axis of rotation of the crank means 38 and the specific means of providing this radially reciprocal motion are not important. It is only necessary that this relative motion be allowable. This radial reciprocal movement direction is shown by arrow 42.

The crank pin 40 preferably includes a first projection 44 which extends in a rearward direction. Positioned adjacent this crank means 38 is a plate cam 48. Plate cam 48 defines a plate cam channel 50 therein which is adapted to receive and retain the first projection 44 of the crank pin 40. The plate cam channel 50 has a profile which preferably is generally square with rounded corners. In this manner rotation of the drive shaft 30 will cause rotation of the crank means 38. This movement will result in a passing of the rearward first projection 44 of the crank pin 40 through the profile of the plate cam channel 50. To achieve controlled linear movement of horizontal shaft means 26 the crank pin 40 will include a second forwardly extending projection 46. This second projection will extend into a vertical guide channel 56 defined by a vertical guide means 54. Vertical guide means 54 is fixedly secured to the horizontal shaft means 26 to be laterally movable therewith. Preferably this vertical guide means 54 takes the form of a bracket member 64.

Now with rotation of the crank means 38 the crank pin 40 will be caused to pass through the profile of the plate cam channel 50. As the rearward projection 44 of the crank pin 40 passes through the top and bottom sections of the profile itself the bracket member 64 will be caused to move in a horizontal direction either from left to right or right to left as shown in FIG. 2. During those portions of the cam profile of the plate cam 48 which are in the left most and right most sections as shown in FIG. 2 there will be no horizontal movement of the bracket member 64 or the horizontal shaft means 26 but there will be movement of the forward second projection 46 of the crank pin 40 through the vertical guide channel 56 of the vertical guide means 54.

Horizontal displacement of the horizontal shaft means 26 is made possible by horizontal yoke bearings 24 which are positioned at those locations where the horizontal shaft means 26 extends through the C-shaped section 66 of yoke member 20. At the outermost sections of the horizontal shaft means 26 will be positioned the mounting member 70 to which may be secured the operational devices for controlling the functions of picking and placing or whatever functions the device is used for. The device may further include spring biasing means 68 positioned between the base 16 and the yoke member 20 to facilitate upward movement thereof along the vertical shaft means 18.

In the operation of the present device it should be appreciated that the ultimate desire is to achieve controlled vertical and horizontal movement of the mounting members 70. This is achieved by the vertical control of the horizontal shaft means 26 performed through the yoke member 20. This control is also achieved by horizontal control of the movement of the horizontal shaft means 26 through the crank means 38. All power for each of these controls is made by the driving of shaft means 30 in the direction shown by arrow 34.

This power is first delivered to a lift cam means 32 to achieve vertical lifting and dropping 14. This lift cam defines the channel 36 therein which receives the yoke pin 28. Vertically movable yoke member 20 is then caused to move in an up and down direction or Y direction to selectively cause lifting and dropping of the horizontally extending shafts 26 and the mounting member 70.

The same power from drive shaft 30 is used for horizontal movement control by the translation linkage specifically supplied by the crank means 38. Rotation of crank means 38 will cause the movement of the rearward section of crank pin 40 through the plate cam channel 50. The forwardly extending projection 46 of the pin will extend into the vertical guide channel 56 and cause horizontal movement of bracket 64. This will result in horizontal movement of the horizontal shaft means 26. The actual horizontal movement will occur during the portion of the cycle wherein the crank pin rear section extends into the horizontally extending portions of plate cam channel 50. With counterclockwise rotation of drive shaft 30 as the pin is in the upper quarter of the plate cam channel 50 the horizontal shaft means 26 will move to the left as shown in FIG. 1. During the time when the pin is in the lowermost portion of the plate cam channel 50 the horizontal shaft means 26 will be moving in the rightward direction as shown in FIG. 1. During those times when the rearward projection 44 of crank pin 40 is in the vertically extending sections of the plate cam channel 50 a dwell condition is created. This dwell means that the forward second projection 46 will be moving vertically within the vertical guide channel 46 and no horizontal movement will be being made by the mounting member 70. It is during this dwell portion of the cycle that vertical movement of the mounting member 70 is achieved. The coordination of this vertical movement such that it occurs during the left and right dwell portions of the device cycle is achieved by choosing proper axial orientation between the radially inwardly extending sections 58 of lift channel 36 and the direction of orientation of the crank means 38. By careful choosing of the orientation between these two devices along the drive shaft 30 the Y stroke 14 may be carefully chosen to occur during times of dwell when there is no X stroke 12.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A linear motion device, for providing a lateral movement stroke and a selective vertical lifting and dropping, which comprises:
   (a) a base member;
   (b) a vertical shaft means fixedly secured with respect to said base member and extending vertically upward therefrom;
   (c) a yoke member movably secured to said vertical shaft means to allow vertical movement of said yoke member therealong, said yoke member including a yoke pin extending outwardly therefrom;
   (d) a drive shaft being rotatably driven;
   (e) a lift cam means fixedly secured with respect to said drive shaft to be rotatably movable therewith, said lift cam defining a lift channel therein positioned to receive said yoke pin of said yoke member therein to operably control the vertical movement of said yoke member along said vertical shaft means responsive to the profile of said lift channel defined within said lift cam means;
   (f) a crank means secured to said drive shaft to be rotatable therewith, said crank means including a crank pin being radially reciprocally movable with respect to said crank shaft, said crank pin also being rotatably movable responsive to rotation of said crank means and said crank shaft, said crank pin including a first projection and a second projection;
   (g) a plate cam fixedly secured with respect to said base member, said plate cam defining a plate cam channel therein adapted to receive said first projection of said crank pin therein to operably control the radial reciprocation of said crank pin with respect to said crank shaft, during rotation thereof, responsive to the profile of said plate cam channel;
   (h) a horizontal shaft means movably secured with respect to said yoke member to allow relative horizontal movement with respect thereto, said horizontal shaft means being vertically movable responsive to vertical movement of said yoke member; and
   (i) a vertical guide means fixedly secured to said horizontal shaft means to be horizontally and vertically movable therewith, said vertical guide means defining a vertical guide channel therein adapted to receive said second projection of said crank pin therein, said vertical guide channel extending in a vertical direction to cause horizontal movement of said horizontal shaft means responsive to the horizontal component of movement of said second projection of said crank pin and to prevent vertical movement of said horizontal shaft means responsive to the vertical component of movement of said second projection of said crank pin, vertical movement of said horizontal shaft means being controlled by vertical movement of said yoke member.

2. The device as defined in claim 1 wherein the profile of said lift channel is generally circular with radially inwardly extending sections to selectively cause lifting of said yoke member and said horizontal shaft means.

3. The device as defined in claim 1 wherein said crank means includes a crank head and a crank body wherein said crank head is radially movably secured with respect to said crank body and wherein said crank pin is secured to said crank head.

4. The device as defined in claim 1 wherein said vertical shaft means comprises two vertically extending members.

5. The device as defined in claim 1 wherein said horizontal shaft means comprises two horizontally extending members.

6. The device as defined in claim 5 wherein said vertical guide means comprises a bracket member extending between said horizontal shafts to define said vertical guide channel on the rearward surface thereof.

7. The device as defined in claim 4 wherein said yoke member includes two C-shaped sections each being vertically movably secured to one of said vertically extending members to maintain true vertical orientation of said yoke member during vertical movement thereof.

8. The device as defined in claim 1 further including a spring biasing means positioned on said vertical shaft means between said yoke member and said base to facilitate lifting movement of said horizontal shaft means.

9. The device as defined in claim 8 wherein said biasing means comprises springs.

10. The device as defined in claim 1 wherein said crank shaft is driven in the counterclockwise direction as viewed from the plate cam side thereof.

11. The device as defined in claim 1 wherein the profile of said plate cam channel is approximately square with rounded corners.

12. The device as defined in claim 1 further including mounting members secured to said horizontal shaft means to provide a mounting location for the operating functional device being secured to the linear motion device.

13. The device as defined in claim 1 wherein said first projection of said crank pin extends in a rearward direction into said plate cam channel.

14. The device as defined in claim 1 wherein said second projection of said crank pin extends in a forward direction into said vertical guide channel.

15. A linear motion device, for providing a lateral movement stroke and a selective vertical lifting and dropping, which comprises:
(a) a base member;
(b) a vertical shaft means fixedly secured with respect to said base member and extending vertically upward therefrom, said vertical shaft means comprising two vertically extending members;
(c) a yoke member movably secured to said vertical shaft means to allow vertical movement of said yoke member therealong, said yoke member including a yoke pin extending outwardly therefrom, said yoke member comprising two interconnected C-shaped sections each being vertically movably secured to one of said vertically extending members to maintain true vertical orientation of said yoke means during vertical movement thereof;
(d) a drive shaft being rotatably driven;
(e) a lift cam means fixedly secured with respect to said drive shaft to be rotatably movable therewith, said lift cam defining a lift channel therein positioned to receive said yoke pin of said yoke member therein to operably control the vertical movement of said yoke member along said vertical shaft means responsive to the profile of said lift channel defined within said lift cam means, said lift channel defining a generally circular profile with radially inwardly extending sections to selectively cause lifting of said yoke member;
(f) a crank means secured to said drive shaft to be rotatable therewith, said crank means including a crank pin being radially reciprocally movable with respect to said crank shaft, said crank means further including a crank head and a crank body wherein said crank head is radially movably secured with respect to said crank body and wherein said crank pin is secured to said crank head, said crank pin also being rotatably movable responsive to rotation of said crank means and said crank shaft, said crank pin including a first projection and a second projection;
(g) a plate cam fixedly secured with respect to said base member, said plate cam defining a plate cam channel therein which has a profile being approximately square with rounded corners, said plate cam channel adapted to receive said first projection of said crank pin therein to operably control the radial reciprocation of said crank pin with respect to said crank shaft, during rotation thereof, responsive to the profile of said plate cam channel;
(h) a horizontal shaft means movably secured with respect to said yoke member to allow relative horizontal movement with respect thereto, said horizontal shaft means being vertically movable responsive to vertical movement of said yoke member, said horizontal shaft means comprising two horizontally extending members;
(i) a vertical guide means fixedly secured to said horizontal shaft means to be horizontally and vertically movable therewith, said vertical guide means defining a vertical guide channel therein adapted to receive said second projection of said crank pin therein, said vertical guide means comprising a bracket member extending between said horizontal shafts to define said vertical guide channel on the rearward surface thereof, said vertical guide channel extending in a vertical direction to cause horizontal movement of said horizontal shaft means responsive to the horizontal component of movement of said second projection of said crank pin and to prevent vertical movement of said horizontal shaft means responsive to the vertical component of movement of said second projection of said crank pin, vertical movement of said horizontal shaft means being controlled by vertical movement of said yoke member;
(j) a spring biasing means positioned on said vertical shaft means between said yoke member and said base to facilitate lifting movement of said horizontal shaft means; and
(k) mounting members secured to said horizontal shaft means to provide a mounting location for the operating functional device being secured to the linear motion device.

* * * * *